United States Patent
Smith et al.

(10) Patent No.: US 8,380,870 B2
(45) Date of Patent: Feb. 19, 2013

(54) METHOD AND SYSTEM FOR FILTERING OF NETWORK TRAFFIC

(75) Inventors: Christopher A. Smith, Arlington, VA (US); Michael A. Bentofsky, Falls Church, VA (US); Sean Mountcastle, Herndon, VA (US); Piet Barber, South Riding, VA (US)

(73) Assignee: Verisign, Inc., Mountain View, CA (US)

( * ) Notice: Subject to any disclaimer, the term of this patent is extended or adjusted under 35 U.S.C. 154(b) by 345 days.

(21) Appl. No.: 12/536,387

(22) Filed: Aug. 5, 2009

(65) Prior Publication Data

US 2011/0035469 A1 Feb. 10, 2011

(51) Int. Cl.
G06F 15/16 (2006.01)
(52) U.S. Cl. ......... 709/235; 709/224; 709/225; 370/229
(58) Field of Classification Search .......... 709/220–225, 709/229; 370/229–235
See application file for complete search history.

(56) References Cited

U.S. PATENT DOCUMENTS

| | | | | |
|---|---|---|---|---|
| 5,546,390 | A * | 8/1996 | Stone ............................ | 370/408 |
| 6,539,394 | B1 | 3/2003 | Calvignac et al. | |
| 6,594,268 | B1 | 7/2003 | Aukia et al. | |
| 7,133,400 | B1 * | 11/2006 | Henderson et al. ........... | 370/389 |
| 8,203,941 | B2 * | 6/2012 | Johnson et al. ............... | 370/230 |
| 2002/0010800 | A1 * | 1/2002 | Riley et al. .................... | 709/249 |
| 2002/0087889 | A1 * | 7/2002 | Zaborovsky et al. ......... | 713/201 |
| 2003/0210649 | A1 * | 11/2003 | Bondi ............................ | 370/229 |
| 2004/0028047 | A1 | 2/2004 | Hou et al. | |
| 2006/0224673 | A1 * | 10/2006 | Stern et al. .................... | 709/206 |
| 2006/0256788 | A1 * | 11/2006 | Donahue ....................... | 370/389 |
| 2008/0109902 | A1 * | 5/2008 | Grosse et al. .................. | 726/22 |
| 2008/0209057 | A1 * | 8/2008 | Martini et al. ................ | 709/229 |
| 2008/0285454 | A1 * | 11/2008 | Corl et al. ..................... | 370/235 |
| 2008/0291934 | A1 * | 11/2008 | Christenson et al. ......... | 370/412 |
| 2010/0274893 | A1 * | 10/2010 | Abdelal et al. ................ | 709/224 |
| 2011/0075678 | A1 * | 3/2011 | Chen et al. .................... | 370/412 |

OTHER PUBLICATIONS

International Search Report and Written Opinion of PCT Application No. PCT/US2010/044402, mailed Oct. 8, 2010, 8 pages total.
"Ad Filtering"—Wikipedia Entry; retrieved from the Internet: <<http://en.wikipedia.org/wiki/Ad_filtering#DNS_Filtering>> on March last modified on Feb. 28, 2009, 3 pages total.
Haystack Laboratories, Inc., NetStalker™ Installation and User's Guide Version 1.0.2, May, 1996, 80 pages total.
PortMaster Filter Configuration Guide, "Figuring Filters 9," retrieved from the Internet: <<http://www.stat.ufl.edu/system/man/portmaster/config/filter.fm.html>> on Mar. 30, 2009, 11 pages total.

* cited by examiner

*Primary Examiner* — Abdullahi Salad
(74) *Attorney, Agent, or Firm* — MH2 Technology Law Group LLP

(57) ABSTRACT

A method of filtering a plurality of DNS queries, wherein each DNS query includes a query name and a resource record type, includes defining a filter rule including a domain name, a filter type, and a throttle percentage and forming a filter file including the filter rule. The method also includes transmitting the filter file from a server to a plurality of filter proxies, transmitting the filter file from each of the plurality of filter proxies to one or more processing engines, and receiving the plurality of DNS queries at one of the one or more processing engines. The method includes determining a match between the domain name and the query name and between the resource record type and the filter type for a subset of the plurality of DNS queries, and blocking a predetermined percentage (equal to the throttle percentage) of the subset of the plurality of DNS queries.

24 Claims, 8 Drawing Sheets

| | |
|---|---|
| *version* | FilterVersion = _pos-int_ |
| *timestamp* | serialNumber = _pos-int_ |
| *drop-ip-rules:* | ipCount = _pos-int_ |
| *ip-rule:* | ipRule_N_ = _CIDR_ _mode_ _ttl_ _throttle_ _timestamp_ |
| *drop-domain-rules:* | domainCount = _pos-int_ _domain-rule*_ |
| *domain-rule:* | domainRule_N_ = _domain_ _dns-type_ _mode_ _ttl_ _throttle_ _timestamp_ |
| *wc-ip-rules:* | wpIPCount = _pos-int_ _ip-rule*_ |
| *wc-domain-rules:* | wcDomainCount = _pos-int_ _domain-rule*_ |
| *header-rules:* | headerCount = _pos-int_ _header-rule*_ |
| *header-rule:* | headerRule_N_ = _bits_ _mode_ _ttl_ _throttle_ _timestamp_ |
| *combo-rules:* | comboCount = _pos-int_ _combo-rule*_ |
| *combo-rule:* | comboRule_N_ = [ip=_ip-rule_] [domain=_domain-rule_] [header=[header-rule_] _mode_ _ttl_ _throttle_ _timestamp_ |
| *CIDR* | _0..255_ [ . _0..255_ [ . _0..255_ [ . _0.255_ ] / _mask-len_ |
| *mask-len:* | 1..32 |
| *bits:* | 0..32 |
| *mode:* | REAL \| TEST |
| *ttl:* | _pos-int_ |
| *throttle:* | 0..100 |
| *domain:* | 9_alnum_ [_alnumdash_]* . ]* _alnum_ [_alnumdash_]* . _alnum_ [_alnumdash_]* |
| *dns-type* | 0..256 |
| *pos-int:* | 0..2^32-1 |
| *alnum:* | a..z \| A..Z \| 0..9 |
| *alnumdash:* | alnum \| - |

*FIG. 2*

```
filtertool    [ add| test exclude <CIDR> [throttle%]]

[ add| test exclude <domain> [<type>] [<throttle>] [<ttl>]]

[ add| test combo [ip=<CIDR>] [domain=<domain> [type]] [header=<mask>
<value>|header=<+| ><symbol> [<+| ><symbol>...]] [<throttle>]]

[ test header [<mask> <value> [<throttle> <ttl>] | <+| ><symbol> [<+| ><symbol>...]
[<throttle> <ttl>]]]

[ del exclude <CIDR>]

[ del exclude <domain> [type]]

[ del exclude <index>]

[ del combo [ip=<CIDR>] [domain=<domain> [type]] [header=<mask>
<value>|header=<+| ><symbol> [<+| ><symbol>...]]]

[ del combo <index>]

[ del header [<mask> <value> | <+| ><symbol> [<+| ><symbol>...]]]

[ del header <index>]

[ activate| deactivate [filtercategory [index]]]

[ list]

[ refresh]

[ flush]

[ help]

Where filtercategory is one of: 'exclude', 'combo', or 'header'.
```

*FIG. 5*

METHOD AND SYSTEM FOR FILTERING OF NETWORK TRAFFIC

BACKGROUND OF THE INVENTION

The internet is an increasingly international network of computers that supports various forms and levels of communication. For instance, on the world wide web (WWW), information can be presented on universally available pages commonly known as websites. The internet also supports one-on-one communication between end-users via electronic email, instant messaging, and voice over IP (VoIP) communication.

Because of the open nature of the internet, security issues involving network communications have presented themselves. As an example, hackers have attempted, and often succeeded, in disrupting and disabling computer systems via the Internet. An example of such harm is a distributed denial of service (DDoS) attack, in which multiple compromised systems flood the bandwidth or resources of a targeted system, usually one or more web servers. In addition to malicious network attacks, errors in network routing data may result in undesirable network traffic. For example, popular sites having misconfigured DNS servers can direct traffic to unexpected targets or top-level domain (TLD) operators In order to counteract malicious attacks on the network, packet filters have been used to increase network security and decrease undesirable traffic. Filters can be used to limit certain kinds of communications by denying the passage of packets through network interfaces. An example of packet filters are the filters used with the PortMaster network interface available from Portmasters.com of Houston, Tex. Filters for restricting network traffic are applied by the PortMaster network interface. As packets attempt to pass through the network interface, filters created by a system operator analyze the header information in the packet and either allow the packet to pass through the network interface or cause the packet to be discarded.

Despite the functionality provided by currently available systems for filtering traffic transmitted through a network, there is a need in the art for improved methods and systems to filter network traffic.

SUMMARY OF THE INVENTION

The present invention relates generally to data networks. More specifically, the present invention relates to methods and systems for filtering network traffic. Merely by way of example, the invention has been applied to a system that distributes packet filters to processing engines that apply the packet filters to internet traffic, blocking a predetermined percentage of the internet traffic for a limited time period. The methods and techniques can be applied to internet protocol (IP) service providers including DNS query traffic, WHOIS query traffic, OCSP lookups, and the like.

According to an embodiment of the present invention, a method of filtering a plurality of DNS queries is provided. Each DNS query includes a query name and a resource record type. The method includes defining a filter rule including a domain name, a filter type, and a throttle percentage and forming a filter file comprising the filter rule. The method also includes transmitting the filter file from a server to a plurality of filter proxies, transmitting the filter file from each of the plurality of filter proxies to one or more processing engines, and receiving the plurality of DNS queries at one of the one or more processing engines. The method further includes determining a match between the domain name and the query name and between the resource record type and the filter type for a subset of the plurality of DNS queries and blocking a predetermined percentage of the subset of the plurality of DNS queries. The predetermined percentage is equal to the throttle percentage.

According to another embodiment of the present invention, a method of filtering network requests is provided. The method includes defining a filter rule including a filter criteria, a filter mode, and a throttle percentage and receiving network requests; analyzing the received network requests. The method also includes determining that a first field in a portion of the received network requests matches the filter criteria and blocking a predetermined percentage of the portion of the network requests. The predetermined percentage is equal to the throttle percentage.

According to a specific embodiment of the present invention, a computer-readable medium storing a plurality of instructions for controlling a data processor to filter network requests is provided. The plurality of instructions include instructions that cause the data processor to define a filter rule including a filter criteria, a filter mode, and a throttle percentage and instructions that cause the data processor to receive network requests. The plurality of instructions also include instructions that cause the data processor to analyze the received network requests and instructions that cause the data processor to determine that a first field in a portion of the received network requests matches the filter criteria and instructions that cause the data processor to block a predetermined percentage of the portion of the network requests. The predetermined percentage is equal to the throttle percentage.

Many benefits are achieved by way of the present invention over conventional techniques. For example, embodiments of the present invention provide methods and systems for quickly and efficiently distributing packet filters to a number of processing engines located at a number of remote sites. Additionally, packet filters provided by embodiments enable a system operator to either fully or partially block malicious network traffic based on a variety of network criteria. Moreover, automatic expiration of the packet filters enables a remote site to return to normal operation after a predetermined period of time, even if contact between the resolution site and the central data center is lost.

Additionally, to ensure packet filters have the desired effect without unexpected side effects, a filtering test mode allows operators to visualize the effects of a filter without affecting the network service. This method of filtering provides a significant additional benefit by providing filtering at the service layer. Moreover, it provides a uniform filtering interface across multiple hardware architectures and operating systems. These and other embodiments of the invention along with many of its advantages and features are described in more detail in conjunction with the text below and attached figures.

BRIEF DESCRIPTION OF THE DRAWINGS

FIG. 2 is a simplified illustration of a filter file grammar according to an embodiment of the present invention;

FIG. 5 is a simplified programming interface for creating a packet filter according to an embodiment of the present invention;

DETAILED DESCRIPTION OF SPECIFIC EMBODIMENTS

As described more fully throughout the present specification, methods and systems provided by embodiments of the present invention provide packet filters that can be used to control the behavior of a network on a request-by-request basis. The filters described herein are useful in a variety of situations that are not addressed by conventional systems. The filter mechanisms have components that are useful to create and distribute filters, filter proxies used in distributing the filters, and processing engines that apply the filters to network traffic.

Embodiments of the present invention provide mechanisms for reapplying active filters so that a loss of connectivity between the source of the filters and a processing engine, for example, in a resolution site, will not result in an undesirable application of the filter beyond a predetermined time. Filters are applicable across multiple platforms through a single, consistent interface. Additionally, some embodiments described herein provision filters are a single source and then propagate the filters to multiple geographically distributed locations in a short period of time, protecting the network from malicious attack.

Figure 7:
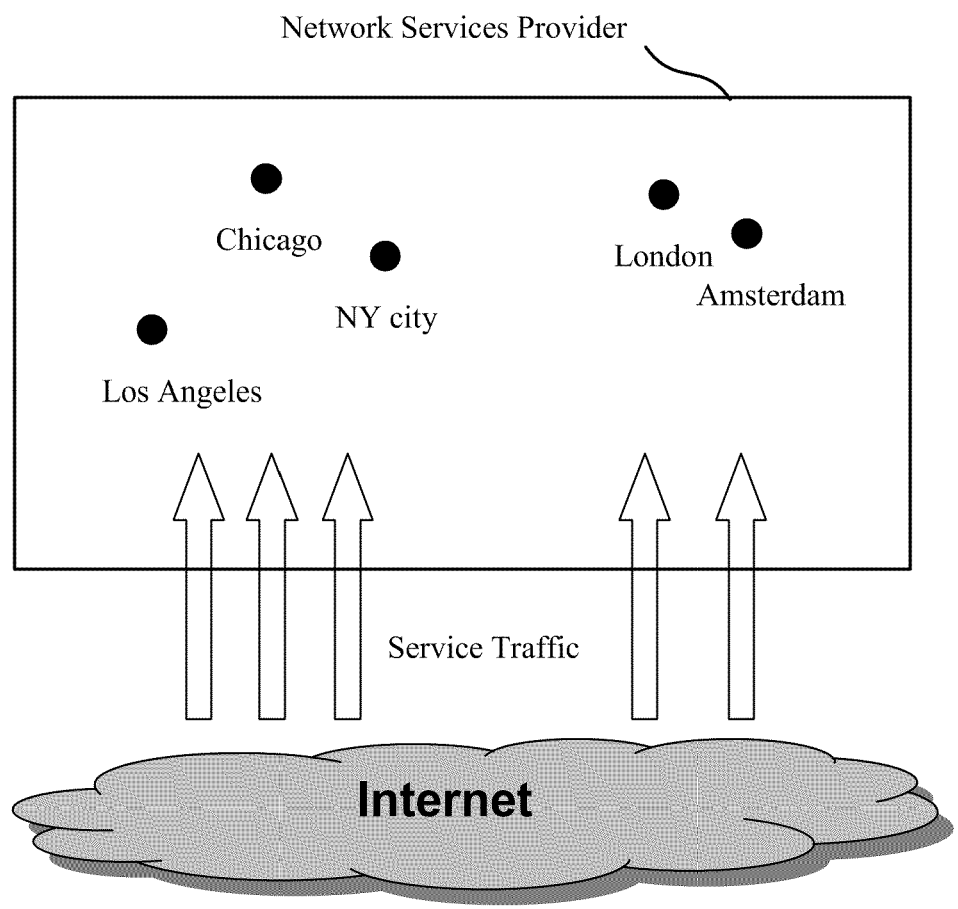
FIG. 7 is a simplified diagram of a multi-site deployment servicing traffic from the Internet.

FIG. 7 is a simplified diagram of a multi-site deployment servicing traffic from the Internet. As illustrated in FIG. 7, a geographically dispersed network service provider handles traffic from the Internet with multiple points-of-presence making up the entire service. Several cities are shown as serviced by the network services provider for purposes of illustration. Service traffic is received by the network services provider from the Internet and service is provided as appropriate to the particular application.

Figure 1:
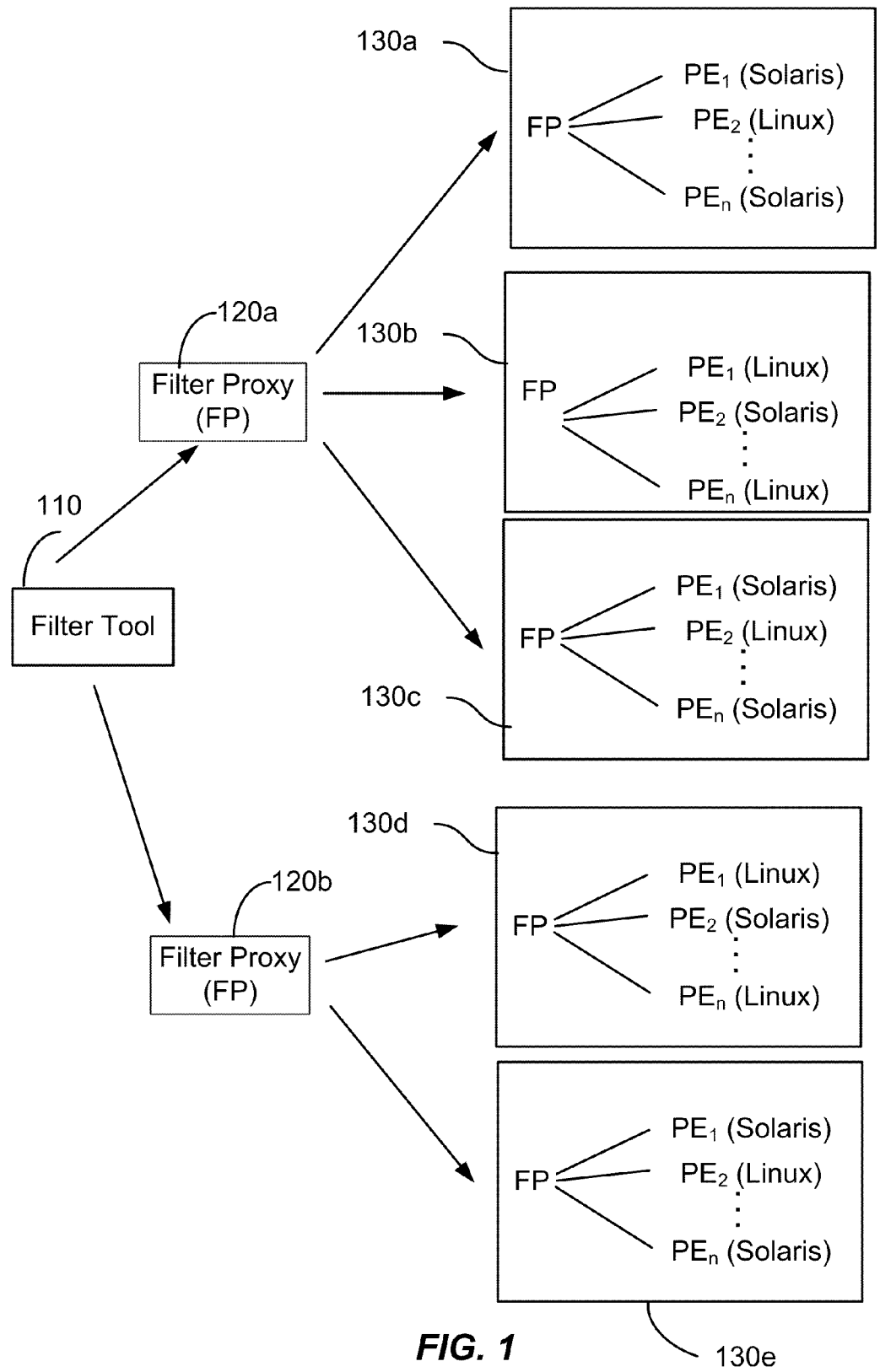
FIG. 1 is a simplified schematic diagram of a system for distributing network traffic filter rules according to an embodiment of the present invention.

FIG. 1 is a simplified schematic diagram of a system for performing network traffic filtering according to an embodiment of the present invention. Referring to FIG. 1, the filter tool 110 is used to define a filter rule. Additional description related to the filter rules is provided more particularly below. The filter tool then appends filter rules to a filter file which is distributed to one or more filter proxies 120a/120b via a network, for example, the internet. Two filter proxies 120a/120b are illustrated in FIG. 1 although more than two filter proxies are utilized in a typical implementation. The filter proxies are located at geographically distributed locations.

The filter proxies 120a/120b then distribute the filter file to additional filter proxies or directly to processing engines. Although only two filter proxies 120a/120b are illustrated in FIG. 1, the present invention is not limited to this particular number and other numbers can be utilized as appropriate to the particular application. Networks at various locations or sites 130a/130b/130c/130e illustrate additional filter proxies distributing packet filters to one or more processing engines $PE_1$-$PE_n$. Thus, at location 130a, a filter proxy is in communication with multiple processing engines. Network location 130d, which is a different location from the other locations 130a/130b/130c/130e, distributes filter files received from filter proxy 120b directly to processing engines $PE_1$-$PE_n$. The processing engines $PE_1$ through $PE_N$ run on different operating systems, including Solaria, Linux, and the like. Although a minimum of three processing engines are illustrated, the present invention is not limited to this particular number, but could utilize more or less depending on the particular application. Additionally, although only Solaris and Linux are illustrated as the operating systems, the present invention is not limited to these particular operating systems and others could be utilized. One of ordinary skill in the art would recognize many variations, modifications, and alternatives.

Of course, depending on the network topology, the number of filter proxies, the number of levels of hierarchy (two in the illustrated example), the total number of processing engines, and the like, can be modified as appropriate to the particular application. As an example, rather than filter proxy 120a distributing filter files to three filter proxies at locations 130a, 130b, and 130c, filter proxy 120a could be in communication with more than three locations, for example, 6 locations. Similar different numbers can be applicable to connections between filter proxy 120b and various locations. Filter proxies can also be chained together to transit multiple networks. As an example, filter proxy 120a could distribute filters to another filter proxy, not co-located with the protocol engines, that new filter proxy could, in turn, distribute filters to another filter proxy, not necessarily co-located with the protocol engines, and so forth. One of ordinary skill in the art would recognize many variations, modifications, and alternatives.

Utilizing the system illustrated in FIG. 1, a single filter tool 110 can be used to quickly and accurately distribute a packet filter to a large number of processing engines located at different geographical sites. Thus, embodiments of the present invention provide for concurrent distribution of filter files to geographically dispersed locations, each containing one or more processing engines, wherein the filter rules are defined consistently and for the same predetermined time period across all the processing engines, which may number in the hundreds or thousands. The hierarchical and concurrent distribution of the filter files to multiple processing engines contrasts sharply with conventional techniques in which the filters are applied to one network, one network interface, one firewall, or the like. For large distributed networks associated with DNS resolution, the rapid and widespread distribution provides benefits not available through conventional systems.

Once a system operator creates and publishes a filter file to the filter proxies, the filter file is distributed quickly to a large number of processing engines. The concurrent distribution results in large networks of processing engines receiving the filter within a short period of time (typically measured in seconds). This is an important aspect of the system implementation for large networks, like the domain name resolution application, in which thousands of servers at sites spanning the globe are utilized.

As described more fully throughout the present specification, the methods and systems described herein provide for filtering of domain name system (DNS) queries, OCSP queries, WHOIS queries, VoIP queries, IM queries, other application protocols at layers above the Internet protocol, and the like. The filtering concepts implemented as embodiments of the present invention provide a system operator with the ability to block or ignore queries for a particular domain name, queries from an IP address or a block of IP addresses, or based upon the request contents, or the like. Although embodiments described herein are discussed in relation to .COM, .NET, and .EDU, the present invention is not limited to these particular top level domains (TLDs) and is also applicable to other TLDs. Embodiments are also applicable to other web services in addition to TLDs. For example, although DNS implementations are described in relation to TLDs herein, other levels of the DNS tree are included within the scope of the present invention.

As an example of network traffic filtering, if a system operator identifies a system on the internet that is behaving erroneously and sending many queries per second to a DNS resolution system, these queries could have an adverse impact on the overall availability of the DNS resolution system. In order to reduce the adverse effect on the Internet, the source of the queries, which could be a misconfigured name server, would be ignored for a predetermined period of time. It is possible, in the case of non-malicious activity, that the system operator could contact the name server controller, who can properly configure the name server, thus eliminating the erroneous queries. After the expiration of the predetermined period of time, the source of the queries would be restored to full access.

The automatic expiration provided by embodiments of the present invention sets the systems described herein apart from conventional filters in which a firewall is modified to prevent access by a particular IP address or block of IP addresses. In these conventional systems, separate filters for the IP address are manually implemented at each firewall, requiring a system operator to configure multiple sites. In order to remove the filters, the system operator has to manually remove the filters, if they can recall the various filters and firewalls on which the filters were implemented. According to embodiments of the present invention, once a filter file is pushed out to all the processing engines, the expiration time included in the filter restores the system to normal operation after a time period equal to the expiration time. Thus, system operator input is greatly reduced by embodiments of the present invention in comparison with conventional systems.

Moreover, embodiments of the present invention provide for adaptive filtering of network traffic in which the filtering behavior is modified in response to the network traffic. For example, if after a first predetermined time, malicious network traffic that is blocked is still attempting to pass through the network, the expiration time of the filter can be extended to continue blocking of the undesirable traffic.

Referring once again to FIG. 1, the methods and systems for filtering of traffic provide solutions that are applicable to many service implementations. As illustrated in FIG. 1, the high-level architecture includes a filtertool 110 that distributes a filter file for a service and distributes it to one or more filter proxies 120. The multiple filterproxy nodes 120 then distribute the filter files to end nodes 130. At the end nodes 130, multiple Service Protocol Engines (PEs) implement a service protocol, but can also be configured to implement the filtering logic based upon the filter files distributed from the filter proxies. When filter rules are set in a PE, as requests are sent to the PE from the Internet, the filter rules are consulted and traffic is either accepted or rejected depending other whether each individual request matches one or more of the filter rules. Thus, utilizing embodiments of the present invention, a filter distribution system that implements a widespread filtering capability is provided.

Figure 8A:
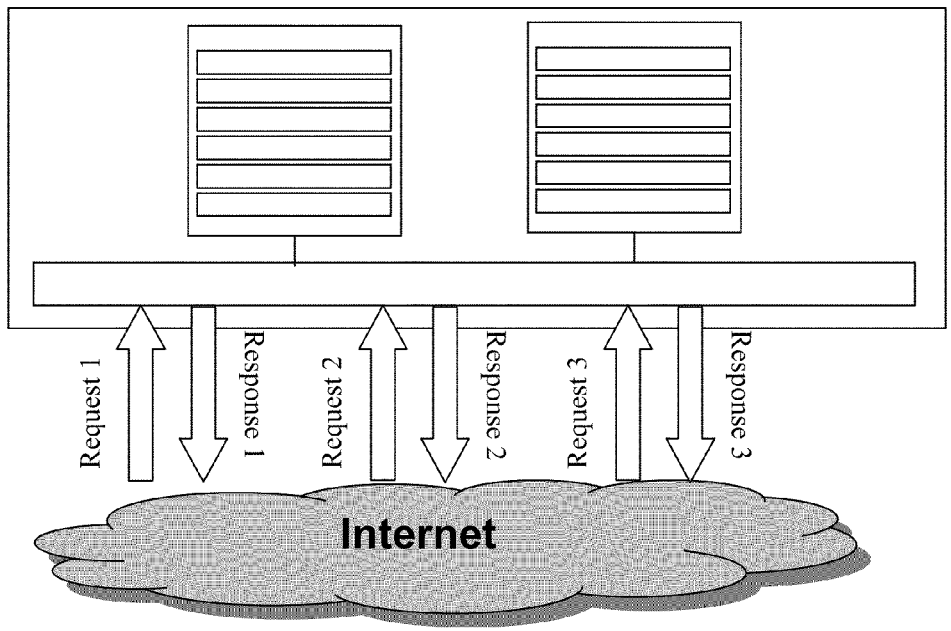
FIG. 8 is a simplified diagram of a service site architecture serving a portion of Internet traffic according to an embodiment of the present invention.

FIG. 8A is a simplified diagram of a service site architecture serving Internet traffic according to an embodiment of the present invention. FIG. 8A illustrates a generalized network service at a single site including a set of computers connected together receiving requests from the Internet and serving responses to the Internet. An exemplary site could be one of the sites 130a-130e illustrated in FIG. 1. As illustrated, each of the requests is provide with a matching response. As an example, if a DNS request is received, then a response including the results of a DNS resolution process would be returned to the requester. Although only three requests and responses are illustrated, one of skill in the art will appreciate that additional requests and responses are typically received and served in actual implementations.

Figure 8B:
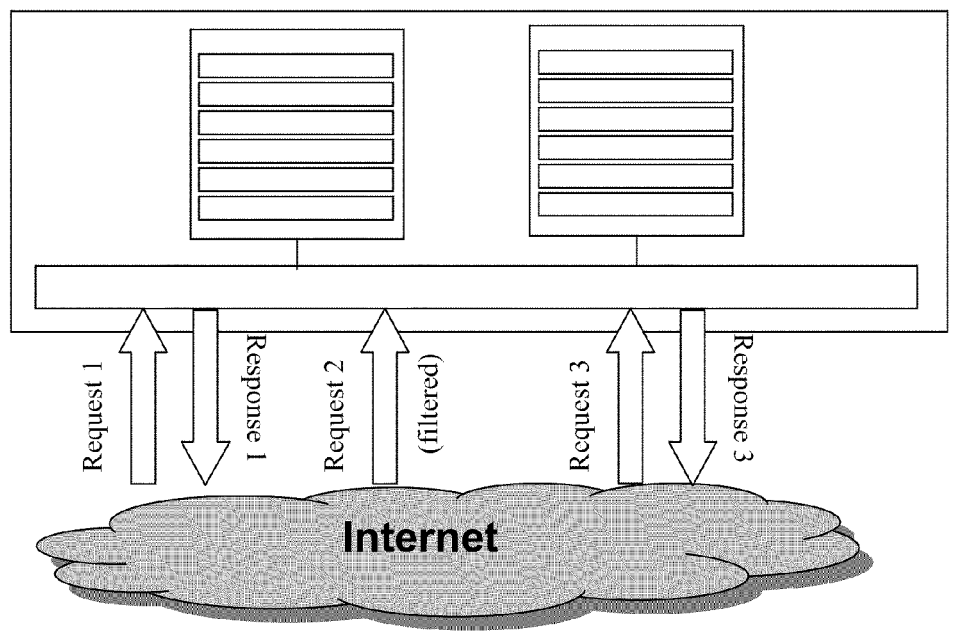

FIG. 8B is a simplified diagram of a service site architecture serving a portion of Internet traffic and filtering another portion of Internet traffic according to an embodiment of the present invention. As illustrated in FIG. 8B, the generalized network service at a single site includes a set of computers connected together as shown in FIG. 8A. As requests are received from the Internet, responses are served for a portion of the requests. However, in contrast with FIG. 8A, Request 2 is filtered using embodiments of the present invention an no response is served to the requester. Additional discussion related to filtering of requests is provided throughout the present specification and more particularly below.

FIG. 2 is a simplified illustration of a generic filter file according to an embodiment of the present invention. The format of a generic filter file in FIG. 2 is pseudo-Backus-Naur Form (pseudo-BNF). The generic filter file represents the framework that a system operator can use to generate filter rules. Examples of particular filter rules are provided below. The generic filter file includes a version number, and a timestamp associated with the creation of the filter, measured in seconds since the epoch. Both the version number and the timestamp are positive integers. IP address filters, domain name filters, protocol header filters, and combination filters are illustrated in the generic filter file illustrated in FIG. 2. These filters will be addressed in turn.

It should be noted that the format of the filter file, and the syntax for defining the various filter files, will share similarities and differences for different services. Thus, the example provided below is merely to illustrate a particular format and syntax and is not intended to limit the scope of the present invention. In practice, the syntax for different kinds of rules is slightly different, and in fact each service will typically have different rules types based upon the kinds of service traffic. At a high-level, the filter file will include: a filter version, which is a technique for handling widespread deployments of code with some nodes running older versions of software while others are more current; a serial number, which is a unique identifier that increases with each change to the filter rule set; a count for each "type" of filter in the file; and a list of individual filter rules (number 0 . . . count) for each "type" of filter in the file. As described below, each filter includes one or more filter rules. Thus, operators create filter files from a series of rules. The rules specify the kinds of traffic that is to be dropped.

At least four types of filter rules for the DNS system are provided by embodiments of the present invention:
(1) Exclude filters have two forms
 a. Network address (e.g., IP address block in CIDR notation)
 b. Domain name and type
(2) Header filters allow filtering on specific elements in the header of the received query packet, including:
 a. the presence or absence of the QR, AA, TC, RD, RA, AD, CD, or Z bits
 b. the response code of the packet (e.g., NOERROR, NXDOMAIN, or the like)
 c. the opcode of the packet (e.g., QUERY, IQUERY, UPDATE, or the like
 d. a hexadecimal representation of the header, allowing one to cover other sections of the header that cannot be symbolically represented, such as section counts (3) Combination filters, which are a combination of both kinds of exclude filters and/or header filters (4) Wildcard filters, which have two forms a. Network address (e.g., IP address block in CIDR notation)

b. Domain name

In the "DNS name and type" form, an exclude rule defines a domain name (e.g., example.com) and query type (e.g., A=1, MX=15, ... ). The query type is also referred to as a resource record type. A request matches the rule when the domain name in the query is identical to the domain name defined in the rule and is for the same query type defined in the rule. It should be noted that this particular filter rule is typically applicable to only to the DNS protocol service.

According to embodiments of the present invention, the wildcard filters are utilized in conjunction with additional configuration of the DNS resolution systems. The DNS system as a whole supports the notion of a "wildcard" record, conceptually similar to a wild card in a poker game: it can be used to fill in for something that one does not have. For example, if a DNS nameserver is queried for a particular name and the name does not explicitly exist in the nameserver's database but a wildcard does, then the nameserver can use the wildcard record to construct a response rather than just responding that the name does not exist.

The wildcard name filter can be used to prevent the system from using a wildcard record when responding to a query that matches the name in the filter. The wildcard network address filter can be used to indicate which netblocks will and which will not receive wildcarded responses. If the system as a whole is configured to utilize wildcarding, then any IP address that matches a wildcard network address filter will not receive a wildcarded response: they will receive a no-such-name response. Conversely, if the system is configured to not utilize wildcarding, then any IP address that matches a wildcard network address filter will receive a wildcarded response rather than a no-such-name error.

For the DNS service, consider the following filters as an example:

(1) Exclude netblock rule for 192.168.17.0/24 at a throttle of 75%

(2) Exclude name-type rule for NO-SUCH-DOMAIN. COM. ANY (3) Exclude header rule matching any query with the RD bit enabled The first rule would block 75% of all queries from IP addresses in the range of 192.168.17.0 through 192.168.17.255. Based on this filter, the queries would be dropped and no response would be sent.

The second rule would block all queries for the name NO-SUCH-DOMAIN.COM with any type. Regardless of the type, the query would be dropped if the queried name were NO-SUCH-DOMAIN.COM.

The third rule would block all queries that have the RD (recursion desired) bit enabled. Typically, these queries are from either resolvers or nameservers attempting to use components of the DNS system as a recursive nameserver rather than relying on a nearby corporate or ISP nameserver.

The IP filters are defined by *drop-ip-rules:*, which includes a counter, ipCount, and an IP rule. The counter ipCount is a positive integer that indicates the number of IP rules associated with the packet filter. The IP rules are defined as ipRule_N_, where N is a sequential ID number for the rule, starting at zero and incrementing by one. The IP rules include the IP address(es) to be blocked, represented in CIDR format, the mode, either real or test, the time limit for the filter (_ttl_), the throttle percentage (between 0 and 100%), and a timestamp. The throttle percentage that is set during creation of the filter indicates the statistical percent of requests to be dropped.

In the "network address" form, an exclude rule defines an IP address or a range of IP addresses. A request matches the rule when the address of the request (also called the source IP address) exactly matches the IP address or falls within the range of addresses defined in the rule. This kind of rule is applicable to multiple services including DNS protocol services, OCSP protocol services, and WHOIS protocol services. The IP filters are generally applicable to any IP-based protocol and their applicability is not limited to the various services described in this specification.

An example of an IP filter is:

FilterVersion=6 serialNumber=1224250330 ipCount=1 ipRule0=192.168.10.0/24 REAL 1800 100 1224086663

In the IP filter illustrated above, the filter version is 6. If a filter proxy does not support the version of the filter, then the filter would be discarded. The serial number is 1224250330, which is a time measured in seconds since the epoch. A single IP rule is included in the IP filter (i.e., ipCount=1). The IP rule for this particular filter is defined as IP rule number zero (counting of the rules starts at zero). The IP filter will block IP addresses in the class C network 192.168.10/24. The filter is operated as a real filter, not in a test mode. The expiration time period for the filter is 1800 seconds (i.e., 30 minutes), the throttle percentage is 100%, and the expiration time is 1224086663, once again measured in seconds since the epoch. The expiration time included in the filter ensures that the filter will expire at a predetermined time. Thus, the distribution and the expiration of the filters is performed automatically.

The example IP filter above utilizes CIDR format to define a plurality of source IP addresses that are to be blocked by the processing engine. The network address 192.168.10.0/24, which is represented in classless inter-domain routing (CIDR) notation, is a Class C network, that is, a group of 256 computers (192.168.10.0-192.168.10.255). Since IP addresses are 32 bits long, the "/24" of the CIDR notation indicates that the most relevant part of the IP address is the top 24 bits, that is, the first three octets: 192.168.10. Although the IP address is given in IPv4 format, other formats, such as IPv6 could be used. One of ordinary skill in the art would recognize many variations, modifications, and alternatives.

In addition to filtering a network of computers using CIDR notation, a single computer, identified by an IP address such as 192.168.10.10, could also be filtered. A notation such as 192.168.10.10/32 could be used to define the IP address to be filtered. Additionally, although CIDR is utilized to define a group of IP addresses for filtering, this particular format is not required by the present invention and other formats, including dotted decimal notation or listing each IP address could be utilized. One of ordinary skill in the art would recognize many variations, modifications, and alternatives.

By modifying the throttle percentage to values between 0 and 100%, a predetermined percentage of the queries coming from the defined block of IP addresses will be blocked, enabling some traffic to pass through the processing engine for filters blocking more than 0%. In the example given above, the throttle percentage of 100% blocks all traffic from the defined network.

An aspect of the present invention that provides benefits to the system operator is the mode of operation: either real or test. The test mode enables the system operator to publish a filter and determine how much traffic would be blocked if the filter was actually implemented by the processing engines. Thus, prior to implementing a filter that could potentially drop an undesired amount of network traffic, the filters can be tested prior to actual implementation. Reporting software is provided to enable the system operator to watch the traffic patterns during test mode to determine what traffic would be dropped after publishing of the filter to the processing engines.

Referring once again to FIG. 2, the domain name (DNS) filters are defined by *drop-domain-rules:*, which includes a counter, domainCount, and a DNS rule. The counter domainCount is a positive integer that indicates the number of DNS rules associated with the packet filter. The DNS rules are defined as domainRule_N_, where N is a sequential ID number for the rule, starting at zero and incrementing by one. The DNS rules include the domain name to be blocked, the resource record type (_dns-type_), the mode, either real or test, the time limit for the filter (_ttl_), the throttle percentage (between 0 and 100%), and a timestamp.

In relation to the _domain_element, the DNS filters are applicable for second (or greater) level domains. An example of a DNS filter for www.example.com is given below. If a DNS query arrives and matches the given second level domain string (i.e., example), the filter will be applied to that DNS query. Domain name filters match all subdomains, but only on label boundaries. That is, the domain name filter is not just checking the suffix. In the example given above, if the DNS query is for www.example.com, the DNS query would be filtered, but not if the DNS query is for firstexample.com. It should be noted that in this particular implementation, example.com would not be blocked by the DNS filter.

The resource record (RR) type is a valid DNS RR type. A current list of valid DNS RR types is available at http://www.iana.org/assignments/dns-parameters. A few examples of the various types are given in Table 1:

TABLE 1

| Registry: TYPE | Value | Meaning |
| --- | --- | --- |
| A | 1 | a host address |
| NS | 2 | an authoritative name server |
| CNAME | 5 | The canonical name for an alias |
| MX | 15 | mail exchange |
| TXT | 16 | text strings |
| Unassigned | 256 | unassigned |

In order to provide for filtering on non-standard types, embodiments of the present invention also accept types in the form TYPE__242, which specifies a non-standard type whose value is 242. This parameter is optional—if it is omitted, the filter will match all types. Note that specifying TYPE_ALL does result in the same filter definition, since "ALL" is a normal DNS query type, and therefore a "TYPE_ALL" filter matches only those queries with that specific type.

An example of a DNS filter is:
FilterVersion=6
serialNumber=1224250330
domainCount=2
domainRule0=example.com 1 REAL 1800 75 1224086686
domainRule1=verisign.com 15 TEST 1800 100 1224092219

In the DNS filter illustrated above, the filter version is 6. The serial number is 1224250330, which is a time measured since the epoch. The number of filters included in the DNS filter are two, represented by domainCount=2.

The first domain name filter (domainRule0) filters the second level domain "example." The type is TYPE__1, which is a host address. The filter is operated as a real filter, not in a test mode. The expiration time period for the filter is 1800 seconds (i.e., 30 minutes), the throttle percentage is 75%, and the timestamp is 1224086686.

The second domain name filter (domainRule1) filters the second level domain "verisign.com." The type is 15, which is a mail exchange. The filter is operated as a test filter, which will not filter actual traffic, but will provide a system operator with visibility into the impact of the filter if deployed. The expiration time period for the filter is 1800 seconds (i.e., 30 minutes), the throttle percentage is 100%, and the timestamp is 1224092219.

Using DNS filters, if a query comes in on a name and a type that the system operator desires to block, then the query is blocked and no answer is returned to the querying system. As an example, faulty data in the system could result in erroneous DNS queries that could be blocked using embodiments of the present invention. Additionally, the filters described herein could be used to thwart a malicious attack.

Referring once again to FIG. 2, wild card filters, for example, *wc-ip-rules:* and *wc-domain-rules:* are provided as described more fully throughout the present specification.

A header filter rule (in the DNS context) defines the presence or absence of a bit (e.g., QR, AA, TC, RD, . . . ), the response code (NOERROR, NXDOMAIN, . . . ), the operation code (opcode) of the request (QUERY, IQUERY, UPDATE, . . . ) and an additional grammar for other sections. These filter rules are also referred to as protocol header filter rules. A request matches a rule when the defined bit is present and a rule requires the absence of the bit, or vice-versa. Additionally a header filter matches if it generates a response that matches the response code of the rule. Similarly for the other two types, if a request opcode is identical to that of a rule, it will be dropped.

An example of a protocol header filter is:
FilterVersion=6
serialNumber=1224250330
headerCount=1
headerRule0=+RD TEST 1800 100 1224251330

In the protocol header filter illustrated above, the filter version is 6. The serial number is 1224250330, the time measured in seconds since the epoch. The number of rules included in the protocol header filter is one, represented by headerCount=1.

The first (and only for this example) rule is for a DNS protocol header. The rule filters packets with a protocol header of recursion desired enabled. For these packets, a test mode is implemented for 30 minutes, blocking 100% of the packets, with an expiration time of 1224251330.

Protocol header, as used herein, is a general term describing protocols that are suitable for filtering in addition to DNS. As an example, in filtering HTTP requests, each kind of internet browser includes a header that is sent as part of the query. Thus, when an HTTP packet is received, filtering of the packet based on the browser, for example, Microsoft Internet Explorer® or Mozilla Firefox® can be performed.

In contrast to the IP, DNS, and protocol header filters illustrated in FIG. 2 for the DNS resolution system, embodiments of the present invention also provide OCSP filtering as well as filtering for the WHOIS protocol queries.

Three types of filter rules for OCSP are provided by embodiments of the present invention:
(1) Exclude filters have two forms
    a. Network address (e.g., IP address block in CIDR notation)
    b. Certificate issuer identity and certificate number identifier
(2) Combination filters are a combination of both kinds of exclude filters
(3) HTTP header filters are specified to filter upon specifics of an HTTP string (in this case, only the User-Agent header can be filtered upon)

In the OCSP protocol context, an exclude filter of the "certificate identifier form" defines a certificate identifier (certificate serial number and issuer hash). A request matches the rule when it identifies a certificate identifier that is identical to the one identified in the rule.

In the OCSP protocol context, a header filter rule defines the presence of a particular HTTP header called "User-Agent." As will be evident to one of skill in the art, the concept described herein is applicable to headers other than the User-Agent field, including Content-Length, Date, Host, and the like). A full list of HTTP header types is defined at: http://www.w3.org/Protocols/rfc2616/rfc2616-scc14.html. A request matches the rule when it exactly matches the value for a particular header field identified by the header rule.

An example of the use of a filter tool to create an OCSP filter as well as example OCSP filters are illustrated in Table 2.

TABLE 2

```
USAGE: filtertool_ocsp [-add|-test exclude <CIDR> [throttle%] [TTL]]
       [-add|-test exclude <sn> <issuerhash> [<throttle>] [TTL]]
       [-add|-test combo <ip=CIDR> <sn=sn hash> [throttle] [TTL]]
       [-add|-test httpheader <useragent> <value> [throttle] [TTL]]
       [-del exclude <CIDR>]
       [-del exclude <sn> <issuerhash>]
       [-del combo <ip=CIDR> <sn=sn hash>]
       [-del httpheader <useragent> <value>]
       [-activate <exclude|combo|httpheader>]
       [-deactivate <exclude|combo|httpheader>]
       [-list]
       [-refresh]
       [-flush]
       [-help]
Examples:
    filtertool_ocsp -add exclude 192.168.10.0/24 90% 3600
    filtertool_ocsp -add exclude 10.0.0.97/32 80%
    filtertool_ocsp -add exclude 32d4df3ad88cd27cb91dda4606b55c3f 754a5f815
ca9ed480d931abf3ad8b7cb43e22c1dedd2d114e2135e40a3832f0b19c6c6e99034ba10 100% 7200
    filtertool_ocsp -test exclude 192.168.10.0/24
    filtertool_ocsp -activate exclude
    filtertool_ocsp -add combo ip=192.168.10.0/24 sn=32d4df3ad88cd27cb91dda
4606b55c3f 754a5f815ca9ed480d931abf3ad8b7cb43e22c1dedd2d114e2135e40a3832f0b19c6c
6e99034ba10
    filtertool_ocsp -test httpheader useragent mozilla
NOTE: TTL should be >= 60 and <= 86400. Throttle should be > 0% and <= 100%.
    Default TTL is 1800 (secs). Default throttle is 100%.
```

As an example of the use of a filter tool to view a filter file including three filter rules, the following example is given in Table 3.

TABLE 3

```
> filtertool_ocsp -list
S/N: 1227637395
Exclusion filters :
---------------------------------
   1.    192.168.10.0/24 90% 3600
Combo filters :
---------------------------------
   1.    172.28.100.11/32 188263dc4100832888d31045bac04d18
23c52109b470bbe31c6faba727d44d93de8a9a74762b676c378e45feb4458df64fa9e1af8a9cab1a 100%
1800
HTTP Header filters (i.e., Protocol Header filters):
---------------------------------
   1.    (T) useragent mozilla 100% 1800
```

The filter file illustrated in Table 3 includes the following three filter rules:

(1) Filter 90% of traffic originating from 192.168.10.0 through 192.168.10.255 for 1 hour (3600 seconds). This can be referred to as an exclusion filter specification.

(2) All traffic originating from 172.28.100.11 requesting a certificate serial number "188263dc4100832888d31045bac04d18" from CA identifier "23c52109b470bbe31c6faba727d44d93de8a9a74762b676c378e45feb4458df64fa9e1af8a9cab1a" would be filtered for 30 minutes (1800 seconds). This can be referred to as a combination specification.

(3) All traffic with an HTTP header "User-Agent: mozilla" will be filtered, dropping 100% of the traffic, for 30 minutes. In this third filter rule, the use of (T) prior to the rule signifies that this rule is to be operated in test mode.

In order to understand the effects of various filters, an example for the OCSP service is provided below. In this example, three filter rules are enabled:

(1) Exclude rule for 172.28.111.0/24
(2) Exclude rule for Certificate Issuer 1000 and Certificate Identifier 1A27.
(3) HTTP header rule for User Agent "Mozilla 7.8".

The effect of these three filters would depend on traffic from the Internet. Any traffic originating from IP address 172.28.111.0 through 172.28.111.255 would be dropped (connection closed without a response sent). Additionally, any requests for certificate issuer number 1000 and certificate identifier 1A27 would also be dropped. Finally, any request identifying itself as coming from "User-Agent: Mozilla 7.8" would also be dropped.

It should be noted that for OCSP, it is typical for these pieces of information to be sent in the request (e.g., the request source IP address, the certificate authority identifier and certificate number identifier being validated, and the HTTP User-Agent header). The terms "OCSP issuer name" and "OCSP CA identifier" are intended to be synonymous, referring to the a business unit that issues certificates. A unique identifier (termed the CA name and key hash) can unambiguously identify for which issuing agent the request is trying to validate a certificate. The terms "serial number" and "OCSP serial identifier" are intended to be synonymous, referring to the unique bearer of a certificate issued by a particular issuing agent. For example, www.example.com would have an identifier that is unique from www.test.com even though they might hold certificates issued by the same issuing agent. Together, these two pieces of data uniquely identify the bearer of the certificate across all issuing agents.

In the WHOIS protocol context, the exclude filter defines the lookup type (e.g., DOMAIN, NAMESERVER, IPADDRESS, . . . ) and search string. A request matches the rule when it exactly matches the value for the search string and it is for the same type.

Filtering of the WHOIS service is also provided by some embodiments of the present invention. As an example of WHOIS filters, two types of filter rules for WHOIS are illustrated below.

(1) Exclude filters having two forms:
  a. Network address (e.g. IP address block in CIDR notation)
  b. Query string (e.g. example.com or ns1.example.com)
(2) Combination filters are a combination of both kinds of exclude filters.

An example of the use of a filter tool to create a WHOIS filter as well as example WHOIS filters are illustrated in Table 4.

TABLE 4

USAGE: filtertool_whois [-add|-test exclude <CIDR> [throttle%] [TTL]]
    [-add|-test exclude <type> <string> [<throttle>] [TTL]]
    [-add|-test combo <ip=CIDR> <searchstring=string>
    [throttle] [TTL]]
    [-del exclude <CIDR>]
    [-del exclude <type> <string> [<throttle>] [TTL]]
    [-del combo <ip=CIDR> <searchstring=string>]
    [-activate <exclude|combo >]
    [-deactivate <exclude|combo >]
    [-list]
    [-refresh]
    [-flush]
    [-help]
Examples: filtertool_whois -add exclude 192.168.10.0/24 90% 3600
    filtertool_whois -add exclude 10.0.0.97/32 80%
    filtertool_whois -add exclude searchstring=townsend.com
    100% 7200
    filtertool_whois -test exclude 192.168.10.0/24
    filtertool_whois -activate exclude
    filtertool_whois -add combo ip=192.168.10.0/24
    searchstring=townsend.com
NOTE: TTL should be >= 60 and <= 86400. Throttle should be > 0% and <= 100%.
  Default TTL is 1800 (secs). Default throttle is 100%.

For all of the protocols, embodiments of the present invention provide combination rules, which effectively put together two exclude rules. When these combination rules are defined, a request matches the rule when it matches both the IP address in the "network address" rule and the other form of rule (e.g., domain name/type for DNS, CA identifier for OCSP, type/search string for WHOIS, and the like). That is, a combination rule is the logical intersection of two exclude rules.

Finally, since operators can define multiple rules to filter unwanted traffic, a request matches the filter criteria (the set of all filter rules) if it matches any of the individual rules contained in the filter criteria. That is, the filter criteria is a logical union of all of the rules in contains.

As an example of the use of a filter tool to view a filter file including three filter rules, the following example is given in Table 5.

TABLE 5

> filtertool_whois -list
S/N: 1227637395
Exclusion filters :
-----------------------------------
  1.    192.168.10.0/24 90% 3600
Combo filters :
-----------------------------------
  1.  172.28.100.11/32 searchstring=example.com 100% 1800
  2.  (T) 172.28.20.42/26 querytype=NAMESERVER
      searchstring=ns1.example.com 100% 1800

The filter file illustrated in Table 5 includes the following three filter rules:

(1) Filter 90% of traffic originating from 192.168.10.0 through 192.168.10.255 for 1 hour (3600 seconds). This can be referred to as an exclusion filter specification.

(2) All traffic originating from 172.28.100.11 searching for "example.com" be filtered for 30 minutes (1800 seconds). This can be referred to as a first combination filter specification.

(3) All traffic originating from 172.28.20.42/26 searching for a nameserver with searchstring"ns1.example.com" be filtered for 30 minutes (1800 seconds) in test mode. This can be referred to as a second combination filter specification.

It should be noted that some of the filter specifications described herein provide the capability to filter based not only on the search string, but also on the query type. This functionality is useful in illustrating that the methods and systems described herein are intended for use among many different network protocols, which can have different filtering needs. Additionally, although the filters illustrated above for the WHOIS application are simple, actual filters are not limited by these simplified examples. Additional complexity can be included in the filter rules, for example, filtering upon wildcards, such as DOMAIN W*.COM; query types, such as DOMAIN queries vs. NAMESERVER queries; or other suitable discriminators in the protocol.

It should be noted that the filters for the various services described herein can be used concurrently or independently from each other. Thus, implementation of DNS filtering rules is not dependent on implementation of WHOIS filtering rules. One of ordinary skill in the art would recognize many variations, modifications, and alternatives.

The syntax illustrated in FIG. 2 is specific to DNS traffic and is not intended to limit the scope of the present invention. Other syntaxes are utilized in embodiments of the present invention suitable to other types of traffic, for example, OCSP traffic, Whois traffic, VoIP traffic, instant messaging (IM) traffic, IP-protocols implemented on a widely deployed service platform, or the like. Thus, although the detailed grammar for these alternative implementations differs from the syntax illustrated in FIG. 2, the modification of the syntax illustrated in FIG. 2 to the particular implementation will be apparent to one of skill in the art.

In addition to filter rules for source IP address, DNS queries, and the like, combination rules are also provided by embodiments of the present invention. An example of a combination filter is:

FilterVersion=6
serialNumber=1224250330
comboRule=1
comboRule0=ip=192.168.10.0/24 header=+RD REAL 1800 50 1224250356

In the combination filter illustrated above, the filter version is 6. The serial number is 1224250330, the time measured in seconds since the epoch. The number of combination rules included in the combination filter is one, represented by comboCount=1.

The first (and only for this example) rule is a real rule applied to source IP addresses in the 19.2.168.10 class-C network. The header of packets from this range of source IP addresses will be examined to determine if a protocol header of recursion desired enabled is present. For these packets, 50% of the packets will be blocked for a period of 30 minutes, with an expiration time of 1224250356.

Although it is common to create packet filters that include only one type of rule, other packet filters can be created that include several different types of rules in a single filter. An example of a packet filter including several different types of rules is:

FilterVersion=6
serialNumber=1224250330
ipCount=1
ipRule0=192.168.10.0/24 REAL 1800 100 1224086663
domainCount=2
domainRule0=example.com 1 REAL 1800 75 1224086686
domainRule1=sign.com 15 TEST 1800 100 1224092219
comboRule=1
comboRule0=ip=192.168.10.0/24 header=+RD REAL 1800 50 1224250356

The packet filter illustrated above includes several rules that were discussed in relation to the source IP filter, the DNS filter, and the combination filter discussed above. Accordingly, the rules included in this packet filter have been discussed in relation to the individual filters in which the rules were utilized. Other combinations of filter types can be combined and this example is merely provided to illustrate use of different types of rules in a packet filter.

In some of the example filter rules found in filter files discussed herein, the expiration time is prior to the creation time of the filter file. This results from the filter rule having been used before and left in the newly created filter file. Since the filter rule has an expiration time prior to the creation time, the filter rule will not be applied. If the filter rule is refreshed, then a new expiration time will be created, enabling the filter rule to be reused without having to recreate the filter rule. Thus, the automatic updating of filter rule expiration times enables easy reuse of filters by the system operator.

In the combination filter illustrated above, the source IP addresses and the packet header are analyzed to determine if a match exists between the fields in the packet and the fields in the filter. Other combinations, such as source IP address and browser type, are also included in the scope of the present invention. Additionally, appropriate packet filters can be used in conjunction with other services such as the online certificate status protocol (OCSP) service offered by the present assignee.

Figure 3:
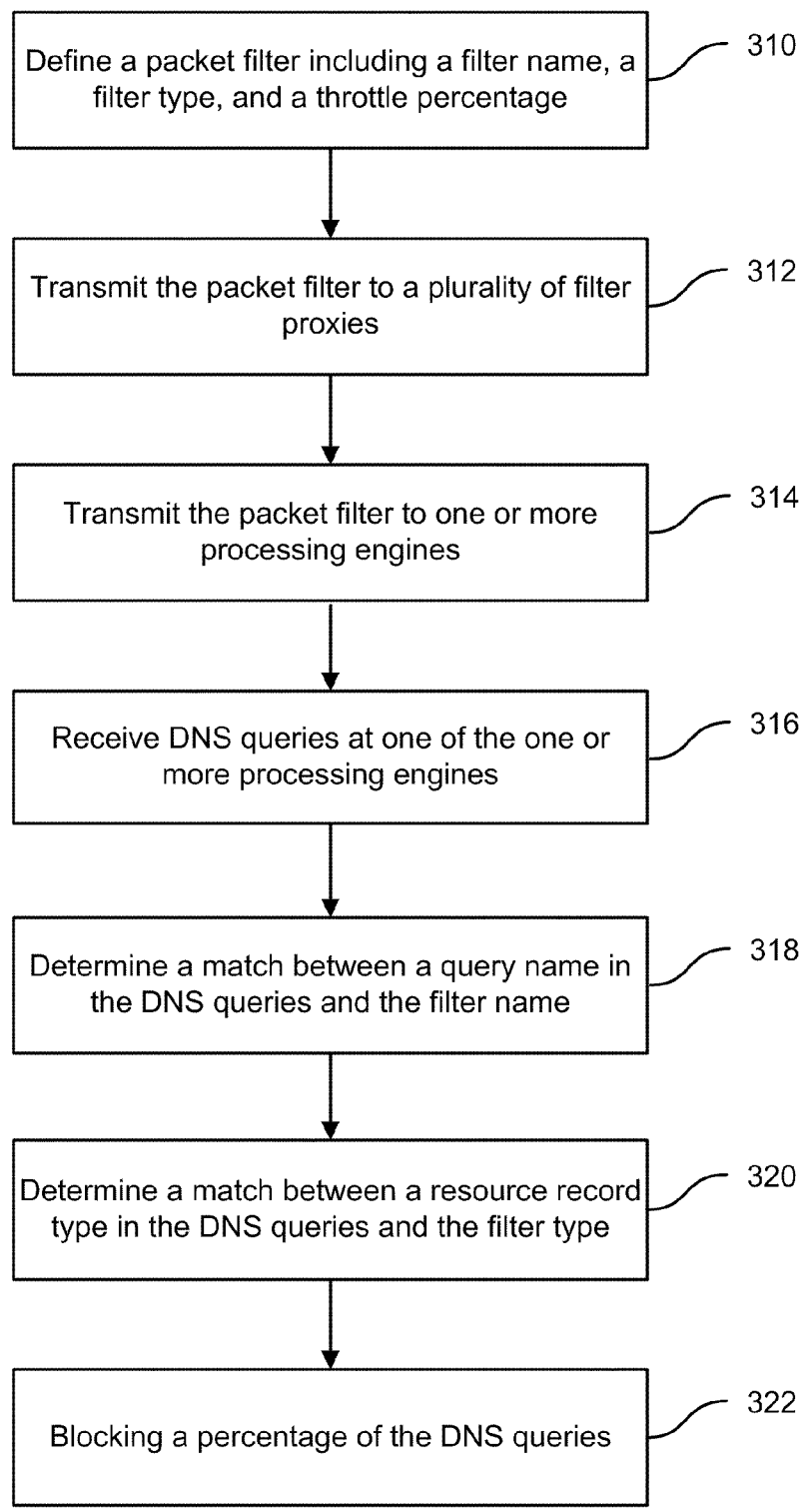
FIG. 3 is a simplified flowchart illustrating a method of filtering a plurality of DNS queries according to an embodiment of the present invention.

FIG. 3 is a simplified flowchart illustrating a method of filtering a plurality of DNS queries according to an embodiment of the present invention. Each DNS query includes a query name and a resource record type. The method includes defining a packet filter including a filter name, a filter type, and a throttle percentage ranging between zero and 100% (310). In an embodiment, the packet filter can further include an expiration time. The packet filter can be refreshed after a predetermined time period that is less than the expiration time. The method also includes transmitting the packet filter from a server to a plurality of filter proxies (312) and transmitting the packet filter from each of the plurality of filter proxies to one or more processing engines (314).

The method further includes receiving the plurality of DNS queries at one of the one or more processing engines (316), determining a match between the query name and the filter name for each of the plurality of DNS queries (318), determining a match between the resource record type and the filter type for each of the plurality of DNS queries (320), and blocking a predetermined percentage of the plurality of DNS queries (322). The predetermined percentage is equal to the throttle percentage.

In some applications, a packet filter status is transmitted from the plurality of filter proxies to the server. The packet filters may be tested before actuation, providing a system operator with an indication of the impact of the proposed filter on network traffic without causing any impact on network traffic. Thus, as described more fully throughout the present specification, filters can be defined as operating in either REAL or TEST modes.

In contrast with conventional systems that are applied at a single network interface, embodiments of the present invention widely distribute the packet filters to the filter proxies, which, in turn, distribute the packet filters to other filter proxies or to processing engines. The processing engines, provided at remote sites, then implement the filters on the network traffic received by the processing engine.

It should be appreciated that the specific steps illustrated in FIG. 3 provide a particular method of filtering a plurality of DNS queries according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple substeps that may be performed in various sequences as appropriate to the individual step. Furthermore, additional steps may be added or removed depending on the particular applications. One of ordinary skill in the art would recognize many variations, modifications, and alternatives.

Figure 4:
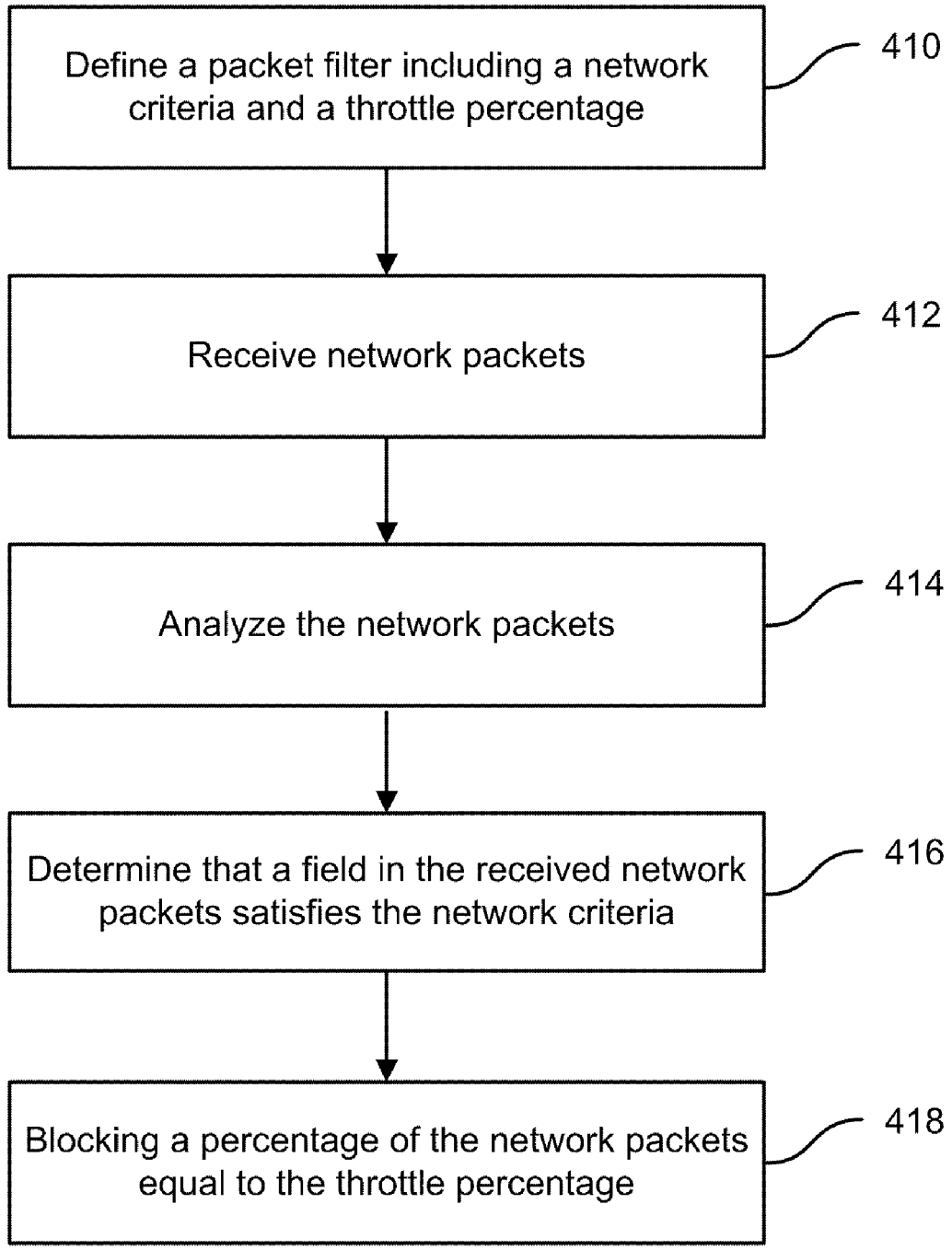
FIG. 4 is a simplified flowchart illustrating a method of filtering network packets according to an embodiment of the present invention.

FIG. 4 is a simplified flowchart illustrating a method of filtering network packets according to an embodiment of the present invention. The method includes defining a packet filter including a network criteria and a throttle percentage less than 100% and greater than zero (410). The packet filter can also include an expiration time. The packet filter can be refreshed by an operator after a predetermined time less than the expiration time. The method also includes receiving network packets (412) and analyzing the received network packets (414). The method further includes determining that a field in the received network packets satisfies the network criteria (416) and blocking a predetermined percentage of the network packets (418). The predetermined percentage is equal to the throttle percentage.

As examples of the network criteria, a source IP address, a DNS query, or a protocol header are included within the scope of the present invention. In an implementation related to filtering of IP addresses, the network criteria could include a plurality of source IP addresses represented in CIDR notation. In this implementation, matching of a source IP address in the received network packets to an IP address in the packet filter would be performed as part of the process of determining that the received network packets satisfy the network criteria.

In an implementation related to filtering of DNS queries, the DNS query includes a name and a type. In this implementation, determining that the received network packets satisfy the network criteria includes matching a query name and a resource record type in the received network packets to the name and the type. Other implementations filter based on an OCSP request or a WHOIS request. Additionally, testing of filter rules prior to blocking network traffic is included within the scope of the present invention. Because the filter rules can be distributed to a plurality of remote sites, the processes of analyzing, determining, and blocking can be performed at the plurality of remote sites. Furthermore, the status of active filters can be reported to a management console.

It should be appreciated that the specific steps illustrated in FIG. 4 provide a particular method of filtering network packets according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 5 is a simplified programming interface for creating a packet filter according to an embodiment of the present invention. The filter tool illustrated in FIG. 5 is used by a system operator to create, delete, publish, and otherwise manage the various filter rules provided by embodiments of the present invention. From a central location (e.g., Filter Tool 110 illustrated in FIG. 1), the system operator manages the set of filter rules that the processing engines (i.e., front-end processes) use to drop incoming packets that meet predetermined network criteria. The filter tool allows operators to add and remove filter rules from the active set, and transmits the current set of filters to each of the remote resolution sites using the filter proxies.

Since, at the resolution sites, packet filters time out after a predetermined expiration period (e.g., 5, 10, 15, 20, 25, 30 minutes, or the like), the filter tool can be used to "recharge" the filters prior to expiration. In a particular implementation in which filters are maintained past the initial expiration period, the filter tool is run with the "refresh" option on a periodic basis (e.g., every 10 minutes) while any filters are active.

Referring to FIG. 5, "add" is used to add a given filter to the active list. The list is then distributed to the remote sites. "del" is used to remove the given filter from the active list, then distribute the list to the remote sites. In some embodiments, "remove" is utilized in place of "del." "refresh" is used to send the active list to the remote sites. "flush" is used to remove all filters, then distribute the empty list. Since multiple rules can be associated with a particular filter, and multiple filters can be active, "refresh" enables the entire set of rules included in the filters to be distributed together. Thus, even if the filters are unrelated to each other, they can be distributed concurrently. Maintenance of the master filter list on the machine running the filter tool enables for different filters with different rules to be published together to all the processing engines. Thus, addition of a filter, changes to a filter, deletion of a filter, or the like are easily republished using "refresh."

"list" is used to display the existing or active filters. In some embodiments, "config" is used to specify a configuration file. The configuration file includes a list of the filter proxies to which filters are published. The filter proxies, in turn, maintain a list of the other filter proxies and/or processing engines to which the filters are passed in turn. "id" is used to specify a process name, the default being "filtertool." Embodiments of the present invention enable the system operator to include multiple "add," "del," and "flush" options on the command line. The various commands will be applied to the active filter list in the order in which they appear. After a filter is deleted, the filters can be republished and distributed throughout the hierarchy, thereby removing the deleted filter from the active filters on the processing engines. Although the syntax for creating filter rules is illustrated in FIG. 5 for a particular network service, the particular syntax illustrated is not intended to limit the scope of the present invention and other syntaxes are suitable as appropriate to the particular application. Thus, for example, as discussed above, "del" or "remove" can be utilized to remove a given filter from the list of active filters.

In another embodiment of the present invention, rather than defining the filter type as REAL or TEST, a filter rule can be added in a test mode by an operator entering "filtertool [test . . . ]" and defining the rule as described above. In order to activate a filter that is in test mode, the operator can enter "filtertool [activate . . . ]" and "filtertool [deactivate . . . ]" to deactivate the particular filter.

For IP filters, the IP address can be in CIDR form as illustrated in FIG. 5 or in other suitable formats. Typically, the prefix length is at least 24 bits and a mask is provided, even if the IP address is provided in /32 format. The throttle percentage is used to determine the number of packets matching the filter criteria to drop. By default, the throttle percentage can be set at 100%, thereby blocking all matching packets. Other percentages, represented by a number between 0 and 100 followed by the percentage sign can also be used. For DNS filters, a second (or greater) level domain to be filtered is listed as well as the DNS resource record type as discussed above.

Figure 6:
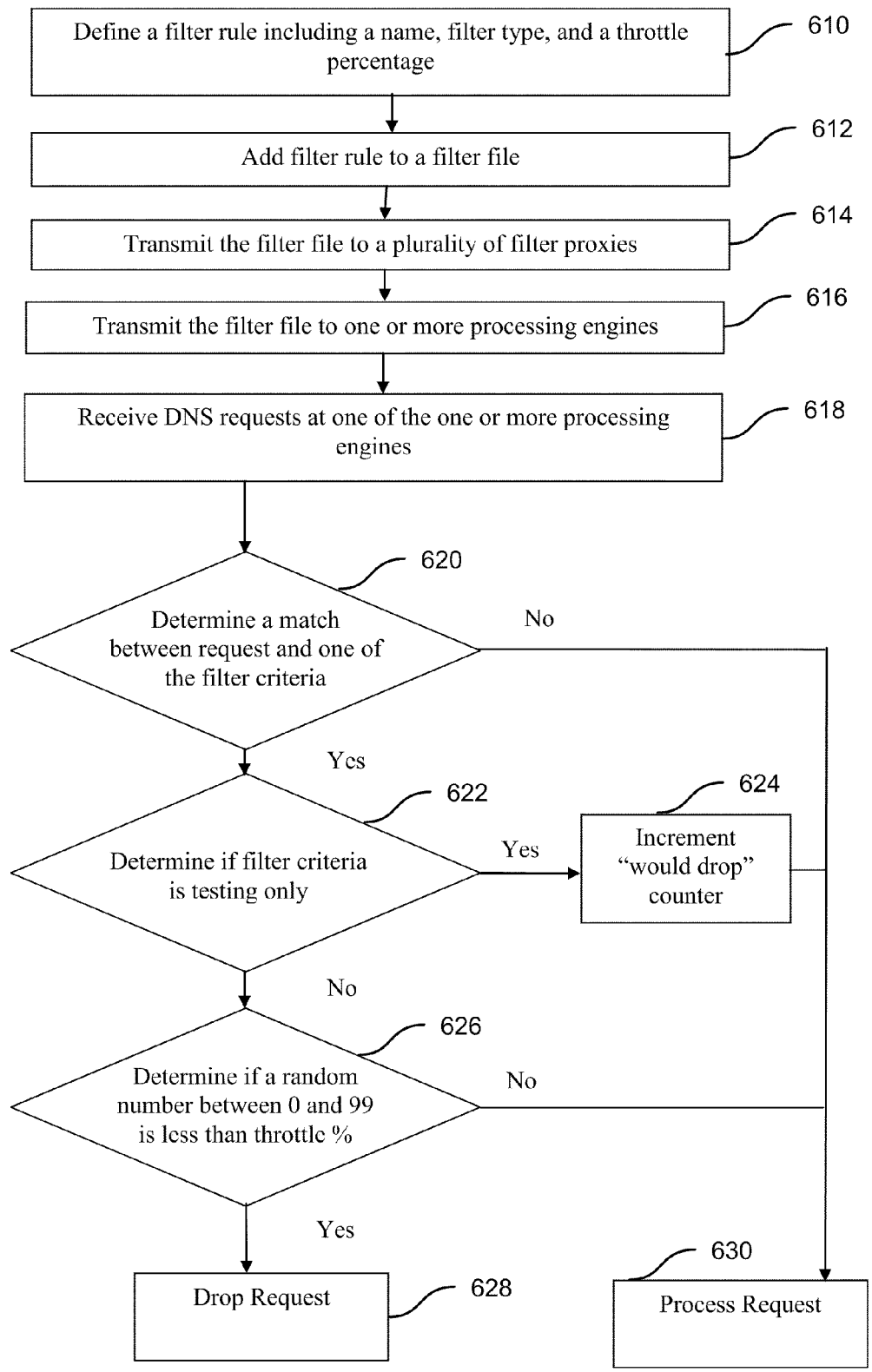
FIG. 6 is a simplified flowchart of a method of filtering traffic according to an embodiment of the present invention.

FIG. 6 is a simplified flowchart of a method of filtering traffic according to an embodiment of the present invention. As illustrated in FIG. 6, the method includes defining a filter rule (610). The filter rule includes a name, a filter type, and a throttle percentage. The filter will also include a filter criteria. The filter type may be one of several different types as described throughout the present specification. The filter rule is added to a filter file (612). In order to distribute the filter file to the processing engines, a hierarchical structure is utilized in which the filter file is transmitted to a number of filter proxies (614) and the filter proxies in turn transmit the filter file to one or more processing engines in communication with the filter proxies (616). A first example of such a hierarchical structure is illustrated in FIG. 1 and a second example is illustrated in FIG. 8.

A DNS request is received at one of the processing engines (618). Since the processing engines have received the filter file, they can perform filtering of the DNS request that is received. A determination is made if a match exists between the DNS request and one of the filter criteria included in the filter rules that are included in the filter file (620). If no match is determined, then the request is processed by the processing engine (630). On the other hand, if a match is determined, then an additional determination is made regarding whether the filter criteria is operating in a test mode (622). If the filter rule is a test mode filter, then a counter associated with requests that would be dropped is incremented (624). Subsequently, the request is processed (630). Thus, embodiments of the present invention provide a mechanism to test filters prior to actual implementation, enabling system operators to determine the impact implementing the filter rule would have on the network traffic.

If the filter rule is not a test mode filter rule, then a random number between 0 and 99% is generated and compared to the throttle percentage (626). If the random number is less than the throttle percentage, then the request is dropped (628) and not processed. If, on the other hand, the random number is greater than the throttle percentage, the request is processed (630). Thus, a number of requests equal to the throttle percentage is dropped, scaling back the traffic to the throttle percentage.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of filtering a plurality of DNS queries, the method comprising:
    defining a filter rule including a domain name, a filter type, and a throttle percentage;
    forming a filter file comprising the filter rule;
    transmitting the filter file from a server to a plurality of filter proxies;
    transmitting the filter file from each of the plurality of filter proxies to a plurality of processing engines;
    receiving a plurality of DNS queries at the plurality of processing engines, wherein each DNS query comprises a query name and a non-content based DNS resource record type;
    determining a match between the domain name and the query name and between the non-content based DNS resource record type and the filter type for a subset of the plurality of DNS queries;
    testing the filter rule, without blocking any packets, by determining a number of packets that would be blocked under the filter rule; and
    blocking a percentage of the subset of the plurality of DNS queries based on the throttle percentage.

2. The method of claim 1 wherein the filter rule further comprises an expiration time.

3. The method of claim 2 further comprising refreshing the filter rule after a time period less than the expiration time.

4. The method of claim 1 further comprising transmitting a filter rule status from the plurality of filter proxies to the server.

5. The method of claim 1 wherein the throttle percentage ranges between zero and 100%.

6. The method of claim 1 wherein defining the filter rule comprises defining at least one of a real mode or a test mode.

7. A method of filtering DNS queries, the method comprising:
    defining a filter rule including a filter criteria, a filter type, and a throttle percentage;
    determining that a first field in a portion of the received non-content based network requests matches the filter criteria;
    receiving a plurality of DNS queries at a plurality of processing engines, wherein each DNS query comprises a query name and a non-content based DNS resource record type;
    determining a match between the filter criteria and the query name and between the filter type and the non-content based DNS resource record type or a portion of the plurality of DNS queries;
    testing the filter rule, without blocking any packets, by determining a number of packets that would be blocked under the filter rule; and
    blocking a percentage of the portion of the DNS queries based on the throttle percentage.

8. The method of claim 7 wherein the filter criteria comprises at least one of a domain name, a range of source IP addresses, or protocol header bits.

9. The method of claim 8 wherein the range of source IP addresses are represented in CIDR notation.

10. The method of claim 9 wherein determining that a first field in a portion of the received DNS queries matches the filter criteria comprises matching a source IP address in the portion of the received DNS queries to an IP address in the filter rule.

11. The method of claim 8 wherein the filter criteria further comprises a DNS resource record type.

12. The method of claim 8 wherein the network criteria comprises a protocol header including an HTTP header.

13. The method of claim 7 wherein the filter rule further comprises an expiration time.

14. The method of claim 13 further comprising refreshing the filter rule after a time period less than the expiration time.

15. The method of claim 7 wherein the network criteria comprises at least one of an OCSP request or a WHOIS request.

16. The method of claim 7 further comprising distributing the filter rule to a plurality of remote sites, wherein analyzing, determining, and blocking are performed at the plurality of remote sites.

17. The method of claim 7 further comprising reporting a status of active filters to a management console.

18. A non-transitory computer-readable medium storing plurality of instructions for controlling a data processor to filter DNS queries, the plurality of instructions comprising:
    instructions that cause the data processor to define a filter rule including a filter criteria, a filter type, and a throttle percentage;
    instructions that cause the data processor to receive a plurality of DNS queries at a plurality of processing engines, wherein each DNS query comprises a query name and a non-content based DNS resource record type;
    instructions that cause the data processor to determine a match between the domain name and the query name and between the filter type and the non-content based DNS resource record type for a portion of the plurality of DNS queries;
    instructions that cause the data processor to test the filter rule, without blocking any packets, by determining a number of packets that would be blocked under the filter rule; and
    instructions that cause the data processor to block a predetermined percentage of the portion of the non-content based network requests based on the throttle percentage.

19. The computer-readable medium of claim 18 wherein the filter criteria comprises at least one of a domain name, a range of source IP addresses, or protocol header bits.

20. The computer-readable medium of claim 19 wherein the filter criteria further comprises a DNS resource record type.

21. The computer-readable medium of claim 19 wherein the range of source IP addresses are represented in CIDR notation.

22. The computer-readable medium of claim 19 wherein the protocol header bits include an HTTP header.

23. The computer-readable medium of claim 18 wherein the network criteria comprises at least one of an OCSP request or a WHOIS request.

24. The computer-readable medium of claim 18 further comprising instructions that cause the data processor to distribute the filter rule to a plurality of remote sites.

* * * * *

UNITED STATES PATENT AND TRADEMARK OFFICE
CERTIFICATE OF CORRECTION

PATENT NO. : 8,380,870 B2  
APPLICATION NO. : 12/536387  
DATED : February 19, 2013  
INVENTOR(S) : Christopher A. Smith et al.

Page 1 of 1

It is certified that error appears in the above-identified patent and that said Letters Patent is hereby corrected as shown below:

Title Page, (75) Inventors: "Christopher A. Smith, Arlington, VA (US); Michael A. Bentofsky, Falls Church, VA (US); Sean Mountcastle, Herndon, VA (US); Piet Barber, South Riding, VA (US)" should read -- Christopher A. Smith, Arlington, VA (US); Michael A. Bentkofsky, Falls Church, VA (US); Sean Mountcastle, Herndon, VA (US); Piet Barber, South Riding, VA (US) --

Signed and Sealed this
Fifteenth Day of April, 2014

Michelle K. Lee
*Deputy Director of the United States Patent and Trademark Office*